United States Patent
Docquier et al.

(10) Patent No.: US 10,089,029 B2
(45) Date of Patent: Oct. 2, 2018

(54) STORAGE IN FLASH MEMORY

(71) Applicant: Proton World International N.V., Diegem (BE)

(72) Inventors: Guillaume Docquier, Liege (BE); Ronny Van Keer, Hoeilaart (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 66 days.

(21) Appl. No.: 15/195,881

(22) Filed: Jun. 28, 2016

(65) Prior Publication Data
US 2017/0185334 A1    Jun. 29, 2017

(30) Foreign Application Priority Data

Dec. 28, 2015 (FR) ...................................... 15 63375

(51) Int. Cl.
| G06F 3/06 | (2006.01) |
| G06F 12/02 | (2006.01) |
| G06F 9/52 | (2006.01) |
| G06F 21/00 | (2013.01) |

(52) U.S. Cl.
CPC .......... *G06F 3/0622* (2013.01); *G06F 3/0631* (2013.01); *G06F 3/0679* (2013.01); *G06F 9/52* (2013.01); *G06F 12/0246* (2013.01); *G06F 21/00* (2013.01); *G06F 2212/1052* (2013.01); *G06F 2212/7202* (2013.01); *G06F 2212/7207* (2013.01)

(58) Field of Classification Search
CPC .. G06F 12/0246; G06F 3/0679; G06F 3/0631; G06F 3/0622; G06F 21/00; G06F 2212/1052; G06F 2212/7202; G06F 2212/7207
USPC ......................................................... 711/103
See application file for complete search history.

(56) References Cited

U.S. PATENT DOCUMENTS

| 2012/0265921 A1* | 10/2012 | Post .................... G06F 12/0638 711/103 |
| 2013/0117503 A1 | 5/2013 | Nellans et al. |
| 2014/0013034 A1* | 1/2014 | Kwon ................. G06F 12/0246 711/103 |
| 2014/0025864 A1 | 1/2014 | Zhang et al. |

FOREIGN PATENT DOCUMENTS

FR    2 950 463 A1    3/2011

OTHER PUBLICATIONS

French Preliminary Search Report, dated Aug. 10, 2016, for French Application No. 1563375, 2 pages.

* cited by examiner

*Primary Examiner* — Jasmine Song
(74) *Attorney, Agent, or Firm* — Seed IP Law Group LLP

(57) ABSTRACT

A method of data storage in a non-volatile memory, wherein the non-volatile memory is divided into: a first region in which each page includes fields adapted to contain data and a field adapted to contain metadata; a second region in which each page includes fields adapted to contain data and a field adapted to contain metadata; a third region adapted to contain indicators of the progress of an operation in the first and second regions, the metadata fields of the first and second regions being respectively adapted to contain, during an operation of data update in a page of the first region, the indexes of a page in the second region and of said page of the first region.

20 Claims, 3 Drawing Sheets

STORAGE IN FLASH MEMORY

This application claims the priority benefit of French patent application number 15/63375 filed on Dec. 28, 2015.

BACKGROUND

Technical Field

The present disclosure generally relates to electronic circuits and, more specifically, to circuits using a flash memory. The present disclosure more particularly aims at the management of data storage in a flash memory.

Description of the Related Art

Flash memories are increasingly used in microcontrollers to non-volatilely store data.

Data storage in a flash memory has various time constraints due to the granularity of the operations performed, the writing and the reading being performed by byte, while the erasing is performed by page.

In certain applications, it is desired to ascertain that the transactions performed and stored respect an atomic criterion. The atomicity of a transaction corresponds to ascertaining that data stored in a memory effectively have a known, utilizable state. This amounts to ascertaining that data in the non-volatile memory either maintain their state before the transaction or have their state after the concerned transaction, but that they do not have an intermediate state.

The management of the transaction atomicity is particularly used in applications where an interruption of the circuit power supply or the occurrence of an incidental or intentional disturbance may generate the storage of data in a state which makes them either impossible to subsequently process or vulnerable in terms of confidentiality.

Many atomicity management techniques, more particularly in microcontrollers applied to so-called security transactions, for example, bank transactions, access control, etc., are known.

BRIEF SUMMARY

It would be desirable to have a solution of data storage in a flash memory which respects the criterion of atomicity of the manipulated data.

It would be desirable to have a solution particularly adapted to transactions based on contactless communications.

Thus, an embodiment provides a method of data storage in a non-volatile memory, wherein the non-volatile memory is divided into: a first region in which each page comprises fields adapted to contain data and a field adapted to contain metadata; a second region in which each page comprises fields adapted to contain data and a field adapted to contain metadata; a third region adapted to contain indicators of the progress of an operation in the first and second regions, the metadata fields of the first and second regions being respectively adapted to contain, during an operation of data update in a page of the first region, the indexes of a page in the second region and of said page of the first region.

According to an embodiment, there are four indicators, which respectively indicate: the beginning of an operation; the nature of the operation; a confirmation that the indicator of the nature of the operation is stable; and the end of the operation.

According to an embodiment, the pages of the second region are used sequentially.

According to an embodiment, for each request for access to a page in the memory, it is started by reading the metadata field of the corresponding page in the first region to determine whether the data are contained in this page or in a page of the second region.

According to an embodiment, during an atomic processing on data contained in a page of the first region, this page contains either the initial data, or the final data, the intermediate data being contained in a page of the second region.

An embodiment provides a method of managing a non-volatile memory in which data are stored by application of the above method.

An embodiment provides a flash memory programmed according to the above method.

An embodiment provides an electronic circuit comprising a flash memory.

The foregoing and other features and advantages will be discussed in detail in the following non-limiting description of specific embodiments in connection with the accompanying drawings.

BRIEF DESCRIPTION OF THE DRAWINGS

Non-limiting and non-exhaustive embodiments are described with reference to the following drawings, wherein like labels refer to like parts throughout the various views unless otherwise specified. One or more embodiments are described hereinafter with reference to the accompanying drawings in which.

DETAILED DESCRIPTION

Figure 1:
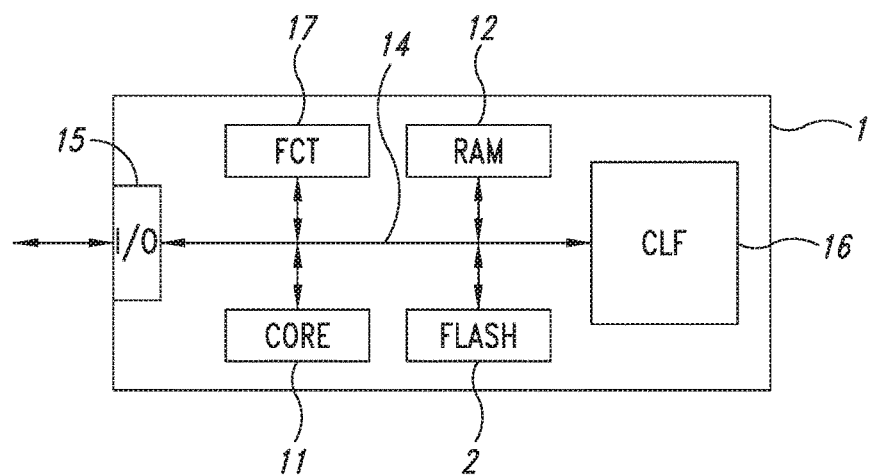
FIG. 1 is a block diagram of an example of an electronic circuit of the type to which the embodiments which will be described apply.

The same elements have been designated with the same reference numerals in the different drawings.

For clarity, only those steps and elements which are useful to the understanding of the embodiments which will be described have been shown and will be detailed. In particular, the electric behavior of a flash memory during write, read, and erase steps has not been detailed, the described embodiments being compatible with usual flash memory technologies. Further, the applications using an atomicity management have not been detailed either, the described embodiments being here again compatible with usual applications.

In the following description, when reference is made to terms approximately, about, and in the order of, this means to within 10%, preferably to within 5%.

FIG. 1 very schematically shows, in the form of blocks, an embodiment of an electronic circuit 1 of the type to which the embodiments which will be described apply as an example.

Circuit 1 comprises: a processing unit 11 (CORE), for example, a state machine, a microprocessor, a programmable logic circuit, etc.; one or a plurality of volatile storage areas 12 (RAM), for example of RAM or register type, to temporarily store information (instructions, addresses, data) during the processings; one or a plurality of non-volatile storage areas, including at least one flash-type memory 2 (FLASH) for durably storing information, in particular when the circuit is not powered; one or a plurality of data, address, and/or control buses 14 between the different elements internal to circuit 1; an input/output interface 15 (I/O) of communication, for example, of series bus type, with the outside of circuit 1.

In applications more specifically targeted by the present disclosure, circuit 1 also integrates a contactless communication circuit 16 (CLF—ContactLess Front-end), of near-field communication type (NFC).

Further, circuit 1 may integrate other functions, symbolized by a block 17 (FCT), according to the application, for example, a crypto-processor, other interfaces, other memories, etc.

The management of the atomicity of transactions in a circuit equipped with a flash memory is particular since the flash memory has a page granularity rather than a bit or byte processing granularity, in particular for erasing. A flash memory is programmed from an initial state to states 0 (non-conductive states of the cells). This means that the memory cells should be set to a high state and that, to store a piece of data, it is chosen either not to act on the bit state, or to program the bit to 0. An erasing (resetting to the high initial state) is necessarily performed by memory page. A page is defined as being the minimum size capable of being simultaneously addressed to be erased. Typically, a page currently amounts, in a flash memory, to 32, 64, 128, 256, or 512 bytes. In practice, this corresponds to the size of a register receiving the data in series to transfer them in parallel to the memory plane for storage.

To guarantee the atomicity of transactions, the data storage in the flash memory should only be performed once the transaction is over and the data are said to be stable. In practice, atomicity management methods activate an indicator of the processing of data when they are extracted from the non-volatile memory, and then organize the storage of the updated data, once the processing is over, the processing indicator then switching state. The atomicity may concern a larger or smaller quantity of data (bytes) according to the nature of the transaction.

The atomicity of transactions is particularly important in the case of bank-type transactions (payment, for example) where it is necessary to ascertain that the information stored in the flash memory, for example, the balance of an electronic purse or a purchase authorization, or the identifier enabling a transaction, is reliably stored.

Generally, to guarantee the atomicity of a transaction, atomicity buffers, which are updated with the initial and then with the final information, are used for a transfer into the main non-volatile memory. If the memory is a flash memory, the need to erase data raises an issue due to it page granularity, which makes the operation relatively long as compared with the write operation, which is performed by bytes.

In contactless applications, transactions have to be carried out very rapidly due to the fugacity of the communication, which is related to the time during which circuit 1 can communicate with a terminal. Now, managing the atomicity of transactions by using flash memory buffers takes time, due to the erase operations which are necessary to allow a programming.

According to the embodiments which will be described, it is provided to divide the flash memory into three regions to which different functions are assigned.

Figure 2:
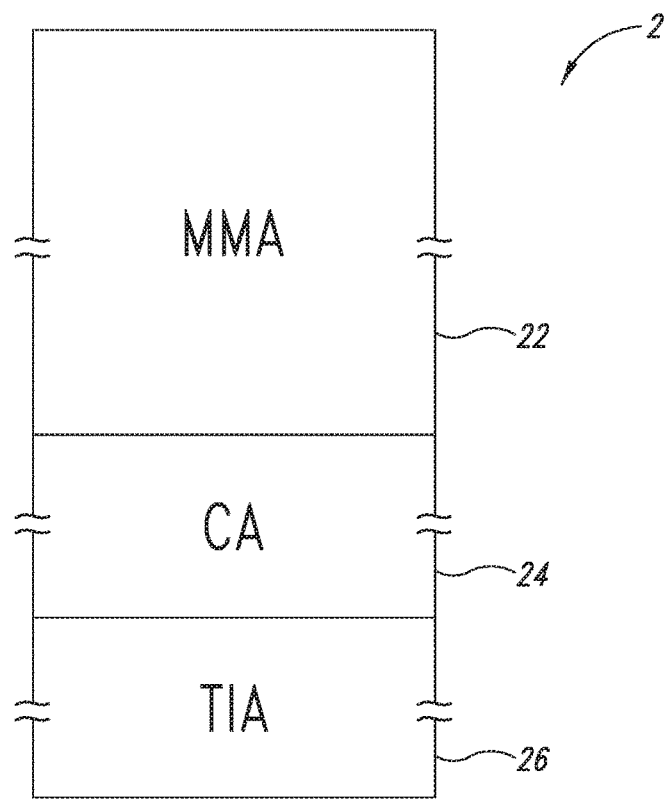
FIG. 2 is a block diagram illustrating a flash memory organization mode.

FIG. 2 is a block diagram illustrating the division of flash memory 2 of FIG. 1 into three regions.

A first region 22 of memory 2, called main memory area (MMA), is assigned to the storage of any information which is not contained in the two other areas, which have specific functions. For example, the information stable in data processings implementing an atomicity management is, between two transactions, stored in this main memory.

A second region 24 is a so-called cache area (CA), adapted to store information during the processing thereof to implement an atomicity process.

A third region 26 is a so-called temporary information area (TIA) adapted to store information indicative of the progress of a transaction using the first two regions and, in particular, flags representative of the state of the data stored in the other regions.

Each page of regions 22 and 24 comprises a portion dedicated to data storage and a portion dedicated to the storage of metadata providing information as to the stability of the data and to the possibility of a storage of the corresponding data in the other region 24 or 22. The use of the pages in regions 22 and 24 is transparent for the user. In other words, the storage system may be seen as a memory region comprising N pages, each page being either located in main region 22 or in cache region 24.

Figure 3:
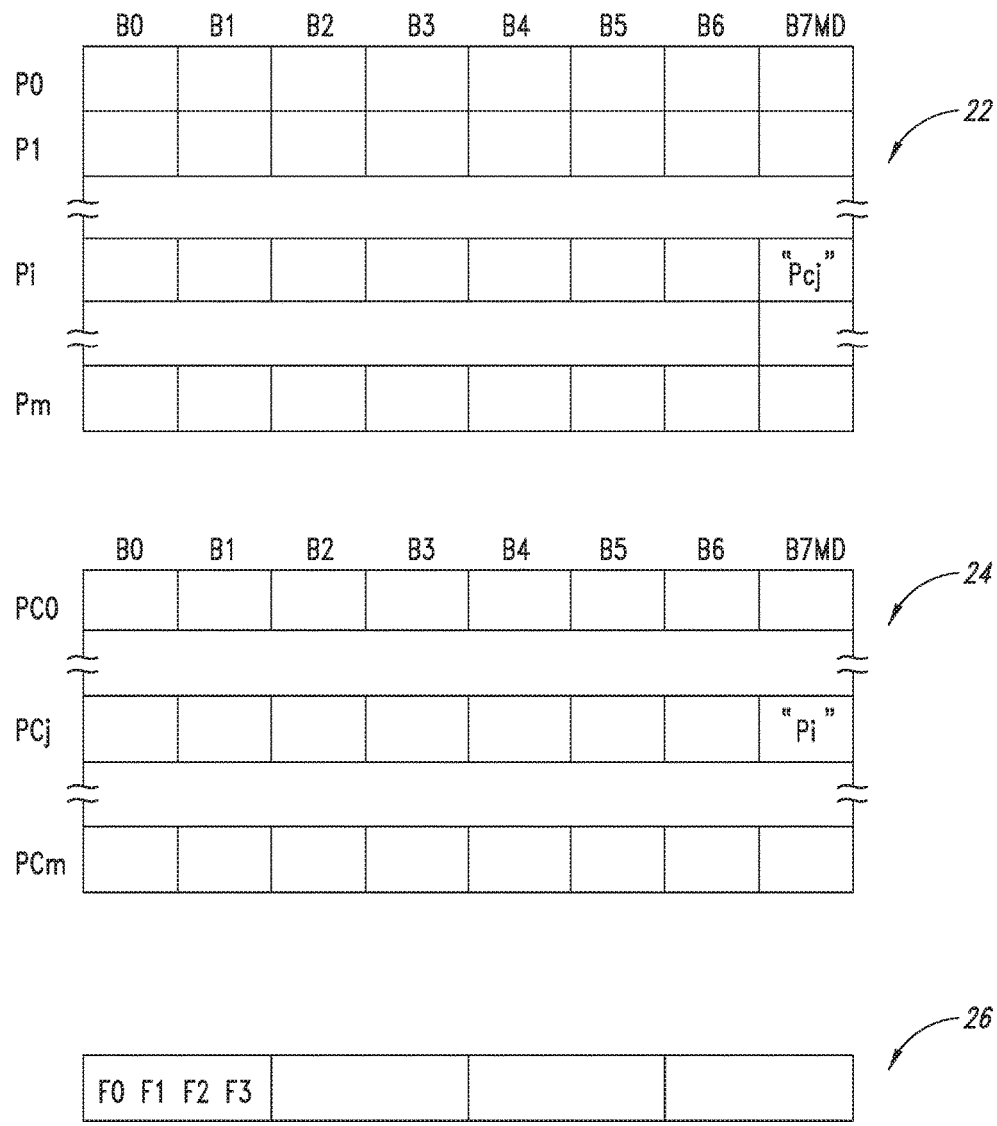
FIG. 3 illustrates an embodiment of a data allocation in the memory of FIG. 2.

FIG. 3 illustrates an example of the content of pages of regions 22 and 24 and of temporary region 26. It is assumed that main region 22 contains n pages and that cache region 24 contains m pages. Preferably, number m of pages of the cache region is smaller than or equal to n. This number conditions the number of atomic update operations which can be performed before erasing the cache region, and thus performing a relatively long operation.

Each page P0, P1, . . . , Pi, . . . , Pn of region 22 and PC0, . . . , PCj, . . . , PCm of region 24 comprises data over a number of bytes (for example, B0 to B6) and a metadata field (for example, B7).

Initially, cache region 24 is empty, that is, the pages have been erased and all bits contain a state 1 (FF).

Memory 2 is usually equipped with a controller transforming logic addresses into physical addresses. Here, during a request for access (in read or write mode) to the flash memory, for a page of logic index i, it is accessed to metadata field B7MD of page Pi of physical index i (or of a conversion of this index) in main region 22. The metadata indicate whether the data of the page in the main memory are correct (in practice, if the field is empty, this means that the data are correct). If not, the metadata area contains the physical index (address) PCj of the cache page where the logic page containing the data is stored. In other words, metadata area B7MD of region 22 contains a field containing the address PCj in region 24 which is programmed when a page of region 22 is processed in region 24.

Metadata area B7MD of a page of region 24 which contains data of region 22 contains a field B7MD with the index or address Pi of region 22 from which data are extracted and a field containing a flag indicative of the use of the page, that is, programmed when the page is displaced into main region 22.

Cache region 24 is sequentially filled from the first PC0 to the last page PCm according to the needs for processing of data contained in region 2. Thus, as long as region 24 is not full, region 24 may keep on being used without it being necessary to perform an erasing.

Temporary region 26 is used to protect the content of the data of the two other regions in the case where a transaction is interrupted. This region contains temporary information formed of four indicators or flags F0, F1, F2, F3. The flags respectively indicate the beginning of an operation (F0), the nature of the operation (F1), a confirmation (F2) that flag F1 is stable, and the end of the operation (F3). The temporary information actually contains all that is necessary to restore the data in the case where the operation is interrupted.

Figure 4:
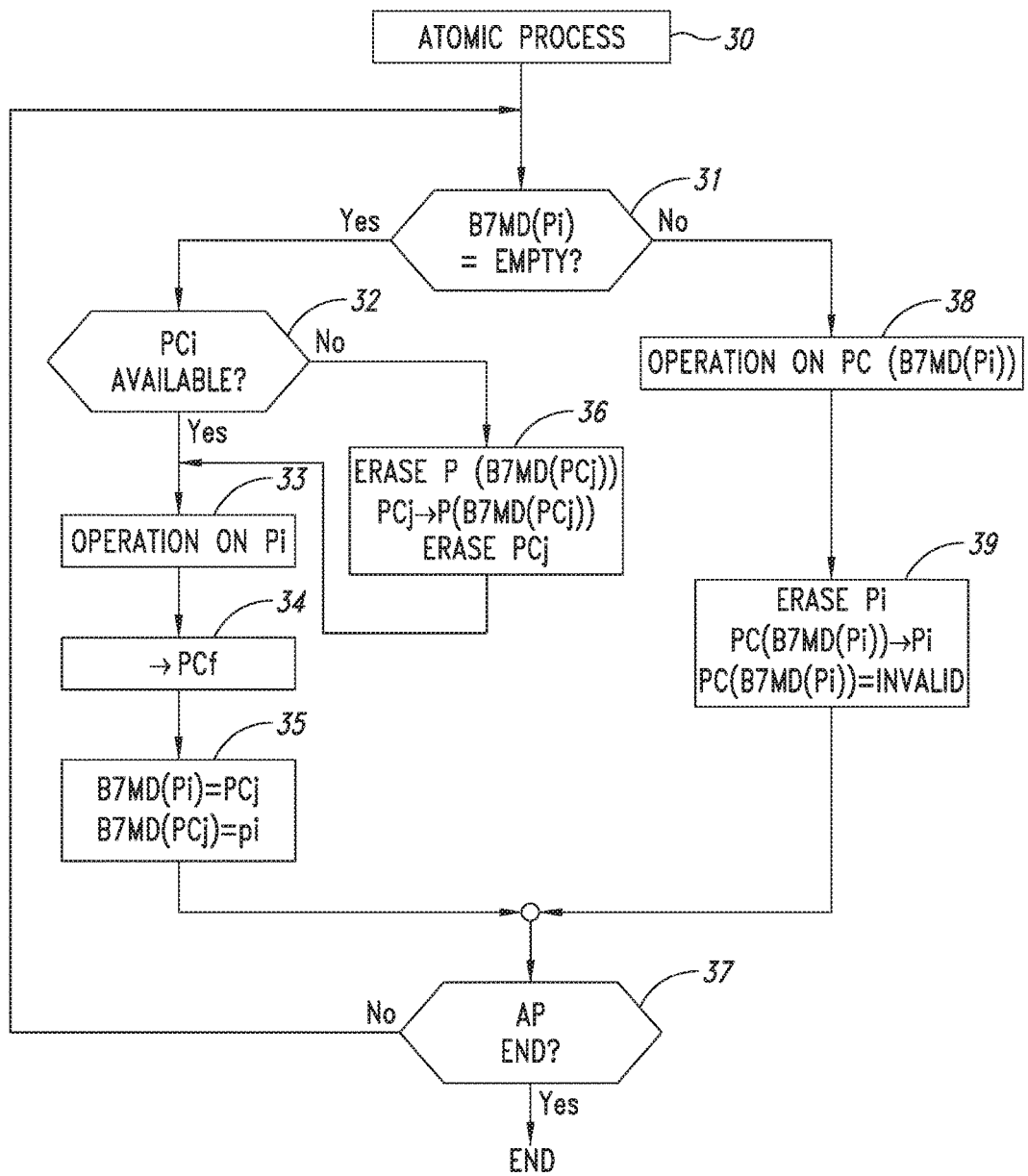
FIG. 4 very schematically illustrates in the form of blocks an embodiment of a method of managing the storage in the flash memory of FIG. 2.

FIG. 4 is a block diagram illustrating the carrying out of an atomic data processing (block 30, ATOMIC PROCESS) on data contained in a page Pi of region 22.

When there is a need for access to page Pi, it is started (block 31, B7MD(Pi)=EMPTY?) by verifying whether the atomic processing has not already been initiated on this page.

If field B7MD(Pi) does not indicate the address of a page Pj in region 24 (output Y of block 31), then the data resulting from the operation performed on data B0 to B6 of page Pi (block 33, OPERATION ON Pi) are stored in the first free page PCj (block 34, ->PCj) of region 24. At the end of the operation, the metadata fields of pages Pi and PCj are updated to store the references of the other page (block 35, B7MD(Pi)=PCj, B7MD(PCj)=Pi).

In practice, it should be ascertained that not all pages PCj have already been written into. To achieve this, before (in the example shown in FIG. 4) or after operation 33 on page Pi, it is tested whether there exists an available page PCj (block 32, PCj AVAILABLE?).

If the answer is positive (output Y of block 32), steps 33 to 35 (or 34 and 35 if test 32 is executed before operation 33) are carried out.

If not, at least one page PCj of region 24 is erased (block 36) to be able to be used again. To achieve this, it is started by erasing (block 36, ERASE P(B7MD(PCj))) a page P of the main region having its other content stored in region 22 by identifying the corresponding page Pi due to field B7MD of page PCj which contains the address of the corresponding page Pi. Then, the content of page PCj is transferred (block 36, PCj->P(B7MD(PCj)) into main region 22, into the page Pi which has just been erased. Finally, page PCj of region 24 is erased (block 36, ERASE PCj), and can then be used again.

It is then returned either to step 33 (shown case), or to step 34.

Once step 35 has been executed, it is tested whether the atomic operation is over (block 37, AP END?). If it is (output Y of block 37), the processing ends (END). If not, it is returned to step 31.

According to an alternative embodiment, at step 36, all the pages PCj of region 24 are erased (block 36) so as to be able to use them again. To achieve this, it is started by erasing (block 36, ERASE P(B7MD(PCj))) all the pages P of the main region having its other content stored in region 22 by identifying the corresponding pages Pi due to fields B7MD of pages PCj which contain the addresses of the corresponding pages Pi. Then, the content of all these pages PCj is transferred (block 36, PCj->P(B7MD(PCj)) into main region 22, into the pages Pi which have just been erased. Finally, all the pages PCj of region 24 are erased (block 36, ERASE PCj). The cache region is then empty to be used sequentially again.

If, during test 31, field B7MD(Pi) is not empty (output N of block 31) and indicates the address of a page PCj in region 24, this means that data B0 to B6 of page Pi are not valid (or are not stable data). The operation is then carried out on the content of page PCj (block 38, OPERATION ON PC(B7MD (Pi)) identified by field B7MD of page Pi. Further, the result of the operation should be stored in a page Pi.

To achieve this (block 39), the page Pi which contains non-valid data is erased (block 39, ERASE Pi), the content of page PC(B7MD(Pi)) is transferred (block 39, PC(B7MD (Pi))->Pi) into the erased page Pi, after which page PC(B7MD(Pi)) is marked as invalid (block 39, PC(B7MD (Pi))=INVALID) so that it is not used again without being previously erased or, as a variation, before a total erasing of cache region 24.

On the side of temporary region 26, flag F0 is activated on starting of the operation on the data, that is, at the starting of step 33 or 38, flags F1 and F2 are also written at the starting of step 33 or 38 to indicate the nature of the operation, and flag F3 is activated before test 37 to indicate the end of the operation.

In the case of an interruption of an atomic processing before completion thereof, the analysis of flags F1 to F3 enables determination of the nature of the interrupted operation (writing into region 22 or into region 24) and, accordingly, determination of a location of the stable data. The last stable data can thus always be recovered, either from region 22 or from region 24.

The described embodiment takes advantage from the difference between the duration of the programming and of the erasing. In practice, in a flash memory, the page erasing operation is relatively long (typically in the order of a few milliseconds) as compared with a byte programming operation (typically in the order of some ten microseconds).

Advantage is also taken from the fact that a flash memory is written by byte, which makes the processing of a transaction by sequential writing into the flash memory compatible with the respecting of an atomic character of transactions. The fact for the reading to be performed, in a flash memory, by full page, is not prejudicial.

The selection of the page size depends on the application and on the maximum size to store a transaction.

An advantage of the embodiments which have been described is that they improve the management of a flash memory for the processing of operations having to respect an atomicity criterion.

The various embodiments described above can be combined to provide further embodiments. Aspects of the embodiments can be modified, if necessary to employ concepts of the various patents, applications and publications to provide yet further embodiments. Various embodiments have been described. Various alterations, modifications, and improvements will readily occur to those skilled in the art. Further, the practical implementation of the described embodiments is within the abilities of those skilled in the art based on the functional indications given hereabove and by using circuits usual per se. Particularly, the organization of the addressing of the memory and the generation of the signals adapted to the control thereof and to this addressing use techniques usual per se.

Such alterations, modifications, and improvements are intended to be part of this disclosure, and are intended to be within the spirit and the scope of the present disclosure. Accordingly, the foregoing description is by way of example only and is not intended to be limiting. The present disclosure is limited only as defined in the following claims and the equivalents thereto.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A non-volatile memory, comprising:
a first region in which each page of the first region comprises a plurality of fields adapted to contain data and at least one field adapted to contain metadata;
a second region in which each page of the second region comprises a plurality of fields adapted to contain data and at least one field adapted to contain metadata;
a third region adapted to contain a plurality of three or more indicators representing progress of an operation in the first region and the second region, wherein each metadata field of the first region and the second region is respectively adapted to contain, during a data update operation in a page of the first region, an index of a page in the second region and an index of said page of the first region.

2. The non-volatile memory of claim 1, wherein the third region is arranged to include at least one group of four indicators, comprising:
a first indicator to indicate a beginning of the operation;
a second indicator to indicate a nature of the operation;
a third indicator to indicate a confirmation that the second indicator is stable; and
a fourth indicator to indicate an end of the operation.

3. The non-volatile memory of claim 1, wherein pages of the second region are used sequentially.

4. The non-volatile memory of claim 1, wherein, each request for access to a page in the non-volatile memory is started by reading a metadata field of a corresponding first region page to determine whether current data is contained in the corresponding first region page or in a page of the second region.

5. The non-volatile memory of claim 1, wherein, during an atomic processing on data contained in a page of the first region, this page of the first region contains either initial data or final data, wherein intermediate data is contained in a page of the second region.

6. The non-volatile memory of claim 1, wherein each page has between 32 and 512 bytes.

7. The non-volatile memory of claim 1, wherein the first region is arranged to include n pages, the second region is arranged to include m pages, and m is less than or equal to n.

8. The non-volatile memory of claim 7, wherein m is equal to n.

9. The non-volatile memory of claim 7, wherein m represents a number of atomic operations that may be performed before the second region is erased.

10. The non-volatile memory of claim 1, wherein subsequent data storage operations are arranged to fill sequential pages of the second region.

11. A method of managing a non-volatile memory, comprising:
providing a first plurality of pages of the non-volatile memory as a first region wherein each page of the first region is arranged to include fields adapted to contain data and a field adapted to contain metadata;
providing a second plurality of pages of the non-volatile memory as a second region wherein each page of the second region is arranged to include fields adapted to contain data and a field adapted to contain metadata;
providing at least one page of the non-volatile memory as a third region, wherein the third region is adapted to contain sets of three or more indicators representing progress of an operation in the first region and the second region; and
performing a data update operation in the non-volatile memory to a first page in the first region, wherein the field adapted to contain metadata of the first page in the first region is updated to contain an index of a page in the second region and wherein a corresponding metadata field of the second region is updated to contain an index of the first page of the first region.

12. The method of claim 11, wherein each set of indicators in the third region includes at least four indicators, the method further comprising:
updating a first indicator to indicate a beginning of the data update operation;
updating a second indicator to indicate a nature of the data update operation;
updating a third indicator to indicate a confirmation that the second indicator is stable; and
updating a fourth indicator to indicate an end of the data update operation.

13. The method of claim 11, comprising:
starting the data update operation by reading the metadata field of a selected first region page to determine whether data contained in the fields of the selected first region page is current data or whether data contained in fields of a corresponding selected second region page is current data.

14. The method of claim 11, wherein, during an atomic processing on data contained in a page of the first region, this page of the first region contains either initial data or final data, wherein intermediate data is contained in a page of the second region.

15. The method of claim 11, comprising:
performing a plurality of subsequent data update operations wherein intermediate data is stored sequential pages of the second region; and
erasing the sequential pages of the second region after each page of the second region is updated with intermediate data.

16. An electronic circuit, comprising:
a processing unit;
at least one functional circuit; and
a flash memory, the flash memory arranged to include:
a plurality of pages in a first region, each page of the first region having data fields and at least one metadata field;
a plurality of pages in a second region, each page of the second region having data fields and at least one metadata field;
at least one set of three or more indicators in a third region, each set of indicators arranged to represent progress of a data update operation in the first region and the second region, wherein metadata fields of the first region are respectively adapted to contain, during data update operations, an index to an intermediate data storage page in the second region, and wherein metadata fields of the second region are respectively adapted to contain, during the data update operations, an index of corresponding pages of the first region.

17. The electronic circuit of claim 16, wherein each set of indicators in the third region, comprises:
a first indicator to indicate a beginning of the data update operation;
a second indicator to indicate a nature of the data update operation;
a third indicator to indicate a confirmation that the second indicator is stable; and a fourth indicator to indicate an end of the data update operation.

18. The electronic circuit of claim 16, comprising
a contactless front-end (CLF) circuit, wherein at least some data associated with the data update operation is passed through the CLF circuit.

19. The electronic circuit of claim 18, wherein electronic circuit is a payment device.

20. The electronic circuit of claim 16, wherein the first region is arranged to include n pages, the second region is arranged to include m pages, and m is less than or equal to n.

* * * * *